(12) United States Patent
Brunson et al.

(10) Patent No.: US 8,281,020 B2
(45) Date of Patent: Oct. 2, 2012

(54) SMART LOAD BALANCING FOR CALL CENTER APPLICATIONS

(75) Inventors: Gordon Brunson, Broomfield, CO (US); Tibor Lukac, Freehold, NJ (US)

(73) Assignee: Avaya Inc., Basking Ridge, NJ (US)

( * ) Notice: Subject to any disclaimer, the term of this patent is extended or adjusted under 35 U.S.C. 154(b) by 291 days.

(21) Appl. No.: 12/241,368

(22) Filed: Sep. 30, 2008

(65) Prior Publication Data

US 2010/0082839 A1  Apr. 1, 2010

(51) Int. Cl.
G06F 15/177 (2006.01)
G06F 15/16 (2006.01)

(52) U.S. Cl. .................... 709/228; 709/220

(58) Field of Classification Search .......... 709/228, 709/220
See application file for complete search history.

(56) References Cited

U.S. PATENT DOCUMENTS

| | | | |
|---|---|---|---|
| 7,412,490 | B2 | 8/2008 | Matsa et al. |
| 7,535,915 | B2 | 5/2009 | Collins |
| 2004/0088424 | A1 | 5/2004 | Park et al. |
| 2005/0044127 | A1* | 2/2005 | Jaiswal et al. ............ 709/200 |
| 2006/0072523 | A1* | 4/2006 | Richardson et al. ........ 370/338 |
| 2007/0201459 | A1 | 8/2007 | Bao et al. |
| 2008/0101335 | A1* | 5/2008 | Badger .................... 370/352 |
| 2008/0222118 | A1 | 9/2008 | Scian et al. |
| 2008/0282254 | A1* | 11/2008 | Blander et al. ............ 718/105 |
| 2009/0013062 | A1* | 1/2009 | Blatherwick et al. ........ 709/222 |
| 2009/0154452 | A1 | 6/2009 | Ku et al. |
| 2010/0077082 | A1* | 3/2010 | Hession et al. ............. 709/227 |
| 2010/0287131 | A1 | 11/2010 | Church |

FOREIGN PATENT DOCUMENTS

| | | |
|---|---|---|
| EP | 1675353 | 6/2006 |
| EP | 1759522 | 3/2007 |
| EP | 2026550 | 2/2009 |
| WO | WO 2005/122544 | 12/2005 |
| WO | WO 2009/018418 | 2/2009 |

OTHER PUBLICATIONS

Farha, Ramy, "SIP Traffic Load Balancing", University of Toronto, School of Electrical and Computer Engineering, available at http://individual.utoronto.ca/rfarha/My_Publications/IASTED_2004.pdf, 6 pages.
U.S. Appl. No. 12/488,277, filed Jun. 19, 2009, Brunson et al.
Official Action for German Patent Application No. 102008062983.9-31, dated Aug. 17, 2009.
European Search Report for Great Britain Application No. 0823698.6, dated Apr. 21, 2009.
"3rd Generation Partnership Project; Technical Specification Group Core Network; IP Multimedia (IM) session handling; IM call model; Stage 2 (Release 7)," Global Systems for Mobile Communication, 3GPP TS 23.218, V7.4.0, Dec. 2006, pp. 1-59.

(Continued)

*Primary Examiner* — Haresh N Patel
*Assistant Examiner* — Lawrence Cosby
(74) *Attorney, Agent, or Firm* — Sheridan Ross P.C.

(57) ABSTRACT

Methods, devices, and systems for smart load balancing are provided. SIP Requests destined for a particular AOR are delivered to one of several registered contact addresses according to associated availability score stored in routing element's contact resolution table. The availability score is periodically updated by the contact entity itself using the SIP PUBLISH mechanism to push the score to the routing element.

16 Claims, 5 Drawing Sheets

OTHER PUBLICATIONS

Lennox et al., "Call Processing Language (CPL): A Language for User Control of Internet Telephony Services," RFC 3880, IETF Standard, Internet Engineering Task Force, Oct. 2004, pp. 1-74.
Drage, "A Session Initiation Protocol (SIP) Extension for the Identification of Services," Internet Engineering Task Force (IETF), Internet Society, Mar. 2009, pp. 1-28.
Official Action for United Kingdom Patent Application No. GB 0823698.6, dated Feb. 8, 2012 5 pages.

* cited by examiner

SMART LOAD BALANCING FOR CALL CENTER APPLICATIONS

FIELD OF THE INVENTION

The invention relates generally to load balancing and load balancing algorithms and more particularly to call load balancing.

BACKGROUND

Session Initiation Protocol (SIP) is an open signaling protocol for establishing many kinds of real-time communication sessions. Examples of the types of communication sessions that may be established using SIP include voice, video, and/or instant messaging. These communication sessions may be carried out on any type of communication device such as a personal computer, laptop computer, Personal Digital Assistant (PDA), cellular phone, IM client, IP phone, traditional telephone, and so on.

One key feature of SIP is its ability to use an end-user's Address of Record (AOR) as a single unifying public address for all communications. Thus, in a world of SIP-enhanced communications, a user's AOR becomes their single address that links the user to all of the communication devices associated with the user. Using this AOR, a caller can reach any one of the user's communication devices, also referred to as User Agents (UAs) without having to know each of the unique device addresses or phone numbers.

Many call centers are equipped with SIP-enabled UAs and other resources. The desire to scale contact management devices in call center applications is ever increasing due to the increased usage of call centers to facilitate customer support and the like. Unfortunately, as more contact management devices are added to a call center the need for more intelligent load balancing algorithms greatly increases.

Current load balancing systems utilized in most call centers rely on a poll-and-response algorithm. Poll-and-response load balancing algorithms are useful but have many deficiencies. As one example, poll-and-response load balancing algorithms require the transmission of at least two messages (a poll message and a response message) to ascertain load information for candidate target devices. This increases the latency of obtaining state information at the call routing device. As another example, the accuracy of load information maintained in the call routing device is based on the polling frequency. Thus, if accurate load information is desired, the call routing device must virtually continuously poll all candidate target devices to determine accurate state information for such devices. This type of continuous polling places a burden on the call routing device and all other devices in the system. Infrequent polling results in less accurate state information for candidate target devices.

SUMMARY

These and other needs are addressed by embodiments of the present invention. Smart load balancing algorithms and load balancing engines executing such algorithms are provided that greatly increase the efficiency and accuracy with which call routing decisions are made in SIP-based applications. In accordance with at least one embodiment of the present invention, a method is provided, the method generally comprising:

receiving, at a load balancing engine, a SIP message from a first of a plurality of SIP network elements, wherein the SIP message provides availability information for the first SIP network element; and updating a table entry in a contact resolution table for the first SIP network element based on information contained in the SIP message, wherein the contact resolution table is utilized to route incoming calls among the plurality of SIP network elements.

In accordance with at least some embodiments of the present invention, the SIP message received at the load balancing engine may either be a subscribed or unsolicited message. As one example, the SIP message may be an unsolicited PUBLISH message. However, embodiments of the present invention may also work when a subscribed message is received.

Smart Load Balancing, in accordance with at least some embodiments of the present invention, provides a straight forward and effective way of load-balancing a group of nearly independent application resources into a much larger aggregate application simply by routing new INVITE messages to the most available SIP network element, where the SIP network element provides a portal to the application resources.

Advantages of the present invention will be primarily discussed in connection with call center SIP-based applications. One skilled in the art will appreciate that any type of call routing application may benefit from the call balancing algorithms of the present invention and the advantages afforded by embodiments of the present invention are not limited to just call center applications. Specifically, any other application with multiple SIP interfaces that is signaled using the AOR and behaves as either a named application or a coverage application may also benefit from call balancing algorithms described herein.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The terms "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic even if performance of the process or operation uses human input, whether material or immaterial, received before performance of the process or operation. Human input is deemed to be material if such input influences how the process or operation will be performed. Human input that consents to the performance of the process or operation is not deemed to be "material".

The term "computer-readable medium" as used herein refers to any tangible storage and/or transmission medium that participates in providing instructions or data to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, RAM, PROM, EPROM, FLASH-EPROM, solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the invention is considered to include a tangible storage medium or distribution medium and prior art-recognized equivalents and successor media, in which the software implementations of the present invention are stored.

The terms "determine," "calculate" and "compute," and variations thereof, as used herein, are used interchangeably and include any type of methodology, process, mathematical operation or technique.

The term "module" or "tool" as used herein refers to any known or later developed hardware, software, firmware, artificial intelligence, fuzzy logic, or combination of hardware and software that is capable of performing the functionality associated with that element. Also, while the invention is described in terms of exemplary embodiments, it should be appreciated that individual aspects of the invention can be separately claimed.

The preceding is a simplified summary of embodiments of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below.

DETAILED DESCRIPTION

The invention will be illustrated below in conjunction with an exemplary communication system. Although well suited for use with, e.g., a system using a server(s) and/or database (s), the invention is not limited to use with any particular type of communication system or configuration of system elements. Those skilled in the art will recognize that the disclosed techniques may be used in any computing application in which it is desirable to balance incoming calls.

The exemplary systems and methods of this invention will also be described in relation to analysis software, modules, and associated analysis hardware. However, to avoid unnecessarily obscuring the present invention, the following description omits well-known structures, components and devices that may be shown in block diagram form, are well known, or are otherwise summarized.

For purposes of explanation, numerous details are set forth in order to provide a thorough understanding of the present invention. It should be appreciated, however, that the present invention may be practiced in a variety of ways beyond the specific details set forth herein.

Figure 1:
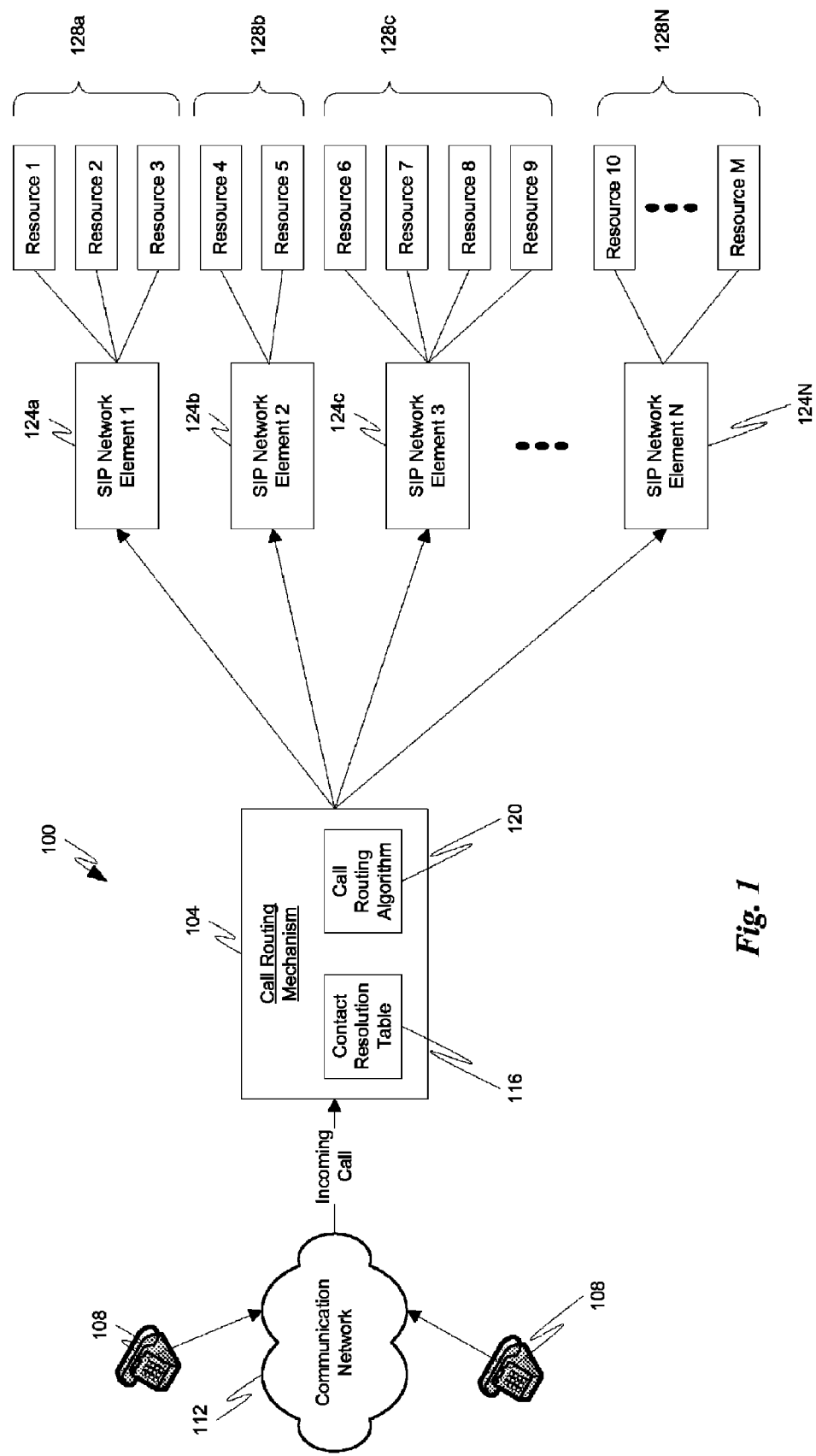
FIG. 1 is a block diagram depicting a communication system in accordance with embodiments of the present invention.

With reference to FIG. 1, an exemplary communication system 100 will be described in accordance with at least some embodiments of the present invention. The communication system 100 may comprise a call routing mechanism 104 in communication with a plurality of communication endpoints 108 via a communication network 112. The communication network 112 may include any type of known collection of data/information transmission equipment. Examples of suitable communication networks 104 include, but are not limited to, the Public Switch Telephone Network (PSTN), a Local Area Network (LAN), a Wide Area Network (WAN) such as the Internet, or any other type of wired and/or wireless network.

The communication endpoints 108 may be packet-switched and/or circuit-switched. Examples of packet-switched communication devices that may be employed in accordance with at least some embodiments of the present invention include IP phones, Personal Digital Assistants (PDAs), Personal Computers (PCs), laptops, packet-based H.320 video phones and conferencing units, packet-based voice messaging and response units, packet-based traditional computer telephony adjuncts, peer-to-peer based communication devices, any type of SIP UA, and any other communication device. Examples of circuit-switched communication devices that may be wired and wireless analog or DCP telephones, PDAs, H.320 videophones and conferencing units, voice messaging and response units, traditional computer telephony adjuncts, and any other communication device.

It should be noted that the invention does not require any particular type of information transport medium between communications devices, i.e., the invention may be implemented with any desired type of transport medium as well as combinations of different types of transport channels. In accordance with embodiments of the present invention, the communication endpoints 108 may be SIP-enabled endpoints. Generally speaking, however, any non-SIP-enabled communication endpoint 108 may be connected to the call routing mechanism 104 via a gateway or the like.

The call routing mechanism 104 is generally adapted to route incoming calls from the communication endpoints 108 among various call handling resources 128. Each resource 128 in the collection of resources may be in communication with the call routing mechanism 104 via a SIP network element 124. In accordance with at least some embodiments of the present invention, the resources 128 may belong to a call center or the like, although the present invention is not limited to such applications. Examples of the types of resources 128 that may be utilized include, without limitation, voicemail systems, Interactive Voice Response (IVR) systems, communication devices associated with call center agents (e.g., phones, computers, laptops, PDAs, video phones, or the like), groups of call center agents, and any other type of SIP-enabled communication device or collection of devices.

Although embodiments of the present invention are being discussed in connection with call center applications, the call routing mechanism 104 is expected to be generally beneficial in many application domains (e.g., voice portal, modular messaging, conferencing, and/or any other application with multiple SIP interfaces that is signaled using AOR's and behaves as either a named application or a coverage application). The call routing mechanism 104 may be the same for all applications and endpoints that are configured to use Smart Load Balancing. Only the most basic parameterization is done for the mechanism 104 to be able to detect mismatches, report errors, and improve efficiency at the infrastructure signaling layer.

The call routing mechanism 104 may be provided with a contact resolution table 116 and a call routing algorithm 120 to facilitate the intelligent routing of incoming calls among the resources 128 and more particularly among the SIP network elements 124 which provide access to the resources 128. Although each SIP network element 124a-N is depicted as being associated with two or more resources 128, one skilled in the art will appreciate that a SIP network element 124 may be associated with a single resource 128 without departing from the scope of the present invention. Furthermore, it may be possible to have one or more resources 128 connected directly to the call routing mechanism 104 (e.g., terminal adapted phones).

In accordance with at least some embodiments of the present invention, the intelligent routing decisions/algorithms described herein and executed by the call routing algorithm 120 may be referred to as Smart Load Balancing. The call routing mechanism 104 will utilize the call routing algorithm 120 in conjunction with the contact resolution table 116 to route each new call to the SIP network element 124 that has the highest score in the contact resolution table 116. The call routing algorithm 120 will then adjust the score in the contact resolution table 116 for the selected SIP network element 124 by an appropriate amount in preparation for the next routing decision (i.e., an adjustby value).

Smart Load Balancing is characterized as one of several contact resolution algorithms that may be configured on the call routing mechanism 104 for a particular AOR. Smart Load Balancing is based on a dimensionless availability score that is reported to the call routing mechanism 104 by each of the registered SIP network elements 124a-N.

In accordance with embodiments of the present invention, two or more of the SIP network elements 124 may be associated with a common AOR. Thus, the call routing mechanism 104 may receive a call directed toward a particular AOR and may attempt to route the incoming call to one of the several SIP network elements 124 (and resources 128) associated with the particular AOR.

In accordance with at least some embodiments of the present invention, asynchronously published ScoreUpdate events received from individual SIP network element 124 update the score and adjustby values for the publishing contact. Thus, information in the contact resolution table 116 for a particular SIP network element 124 may be altered either by the particular SIP network element 124 publishing a ScoreUpdate event to the call routing mechanism 104 or the contact resolution table 116 may be altered by the call routing mechanism 104 in response to the call routing mechanism 104 routing a call to the particular SIP network element 124. In the latter instance, the call routing mechanism 104 will adjust the score for the particular SIP network element 124 by the most recent adjustby value specified by the SIP network element 124. This allows the call routing mechanism 104 to independently update an availability score for a SIP network element 124 even after a plurality of calls have been routed to the SIP network element 124 without receiving an availability update from the SIP network element 124 after each call is routed there. This reduces the overall amount of signaling between the SIP network elements 124 and the call routing mechanism 104 and further increases the efficiency of the system 100.

Figure 2:
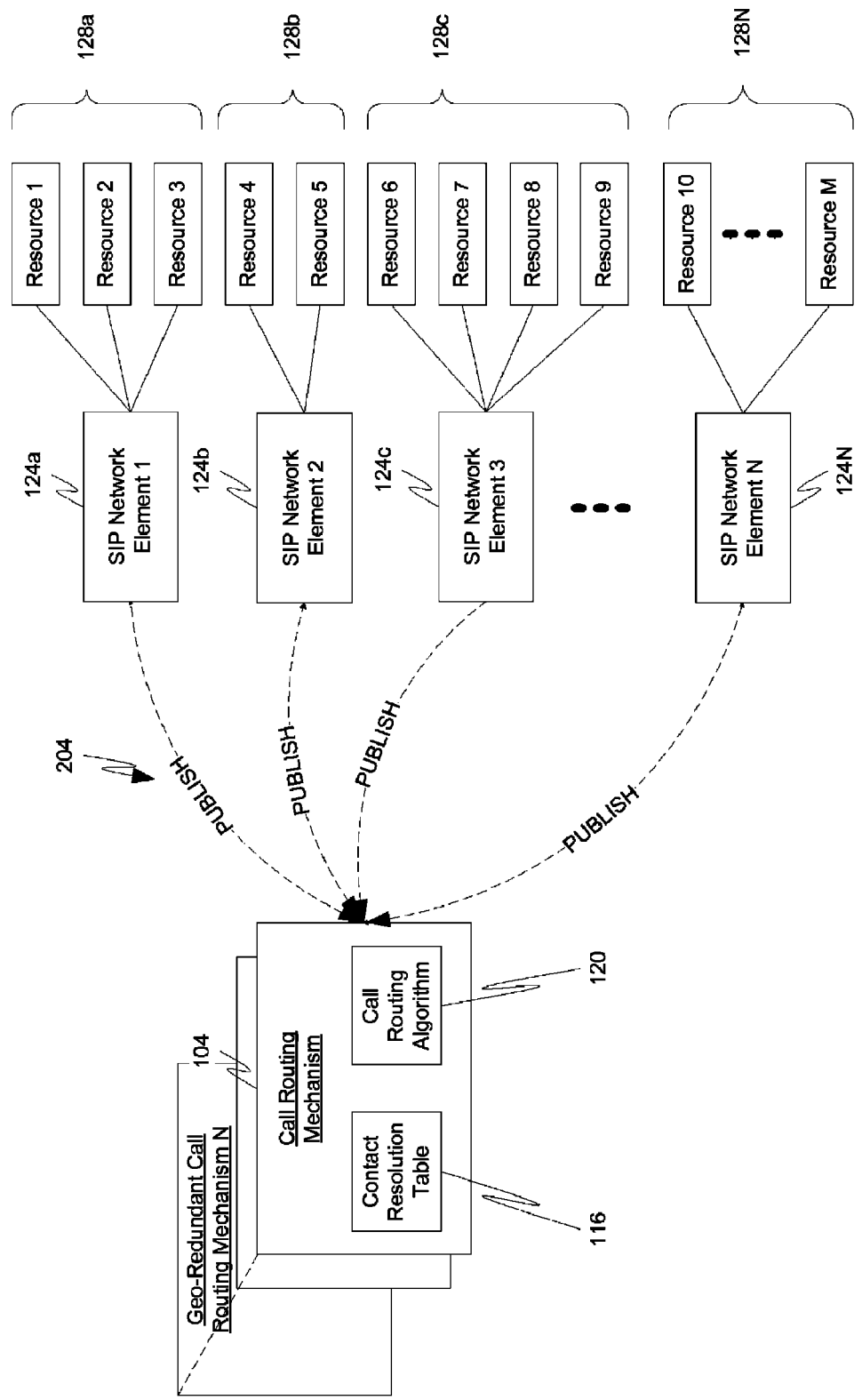
FIG. 2 is a block diagram depicting the utilization of a SIP PUBLISH message to update state information for SIP network elements in accordance with embodiments of the present invention.

Referring now to FIG. 2, further details of providing updated state information to the call routing mechanism 104 will be described in accordance with at least some embodiments of the present invention. The SIP network elements 124 may be enabled to unilaterally push availability status information to the call routing mechanism 104 either periodically or upon the occurrence of a significant state changing event (i.e., a significant change in the availability of the SIP network element 124). Examples of significant state changing events include the addition of a resource 128 to a SIP network element 124, the removal of a resource from a SIP network element 124, the acceptance of an incoming call whose particular resource demands significantly reduce the availability score, and/or the end of previously routed calls which free their resources causing the availability score to increase.

It is generally not necessary that the SIP network element 124 send a message to the call routing mechanism 104 every time that it completes a call, is assigned a call, or otherwise processes a call in the normal fashion. This is due to the fact that the SIP network elements 124 are able to provide adjustby information to the call routing mechanism 104 at only significant changes in its availability. Periodic updates are provisioned to ensure that re-synchronization between a SIP network element 124 and the call routing mechanism 104 is forced to occur after a predetermined amount of time if a significant state changing event doesn't occur within that predetermined amount of time.

In accordance with at least some embodiments of the present invention, the availability status information may be provided to the call routing mechanism 104 in the form of a SIP PUBLISH message. The SIP network element 124 may be enabled to generate the SIP PUBLISH message and populate the message with its score and adjustby values. The SIP network element 124 may then send the SIP PUBLISH message to the call routing mechanism 104.

Provisioning

Several provisioning steps may be followed to successfully have a SIP network element 124 registered with a call routing mechanism 104. In accordance with at least one embodiment of the present invention, an AOR should appear in the contact resolution table 116 of the call routing mechanism 104. An AOR should be assigned for each load balance group. A single application (e.g., a call center application) may support many AOR's, but each AOR should be provisioned, and the load balancing routing decisions will be made with the scope of all SIP network elements 124 registered to a specific AOR.

As another provisioning step, each SIP network element 124 should have a credential assigned thereto. In other words, each assigned AOR can have a password assigned thereto. The password is required to respond to challenges which occur whenever a SIP request comes from a SIP network element 124 claiming to be associated with the AOR on a host that is not in a Trusted Hosts table.

Registration

Registration is the process of binding a SIP network element 124 (SIP UA identified by Host, Port, and Protocol) to its assigned AOR. The call routing mechanism 104 implements Smart Load Balancing to distribute calls only among those SIP network elements 124 which appear in the contact resolution table 116 of an AOR.

In accordance with at least some embodiments of the present invention, target SIP network elements 124 should appear in the contact resolution table 116 along with an Availability "Score" and optional "adjustby" value.

It may be possible to manually provision a SIP network element 124 entry for an AOR. This is required to support load balancing for applications that do not implement Dynamic Registration. Manually entered SIP network elements 124 may not be altered, updated or de-registered using SIP registration messages. In all other respects they behave as if they had been dynamically registered. They are reported along with other contacts in Registration Operations and by the Reg-Event package.

Manually provisioned SIP network elements 124 should also provisions to manually set the Score Signature and Contact Resolution Algorithm Name (cra-name) when they are used with Smart Load Balancing.

Dynamic Registration, on the other hand, automates the task of binding a SIP network element 124 to an AOR, and provides a modest degree of error checking. Dynamic Registration procedures are already implemented in known systems.

A SIP network element 124 presents a Score Signature and a CRA-name as part of its registration request. If these can be validated, the registration of the SIP network element 124 at the call routing mechanism 104 proceeds. If both the Score Signature and CRA-name cannot be validated, the registration fails.

In accordance with at least some embodiments of the present invention, the Score Signature is an opaque string to the call routing mechanism 104. The string contains a Globally Unique Identifier (GUID) that all SIP network elements 124 should have to be included in the load balancing group of the call routing mechanism 104. Registration will proceed if this signature matches the signature of an existing SIP network element 124 for this AOR. If this is the first SIP network element 124 to register, the Score Signature is remembered and used to admit additional SIP network elements 124 which present the same signature.

The Score Signature may be signaled as a parameter in the SIP Contact Header

A mismatch is signaled with a 485 "Ambiguous" SIP response. The response may include the a supported parameter in contact headers.

In accordance with at least some embodiments of the present invention, the CRA-name uniquely identifies the specific contact resolution algorithm that the SIP network element 124 requests the call routing mechanism 104 to use when choosing among the registered SIP network elements 124 for a particular AOR. Generally speaking, only one algorithm will operate for all SIP network elements 124 registered with a particular AOR. The selection of the algorithm occurs with the first entry in the contact resolution table 116, whether it is a provisioned contact or a registered contact. The registration requests a "cra-name." The name includes a version number as a numeric suffix. A successful response returns the selected CRA-name to the SIP network element 124. The numeric suffix will indicate the actual version number of the algorithm in operation. It is permissible to respond with a higher version number or lower version number than the one requested, however the CRA-name root itself must be an exact match. As an example, the requested CRA-name is signaled as an "avaya-asm-cra-name=" parameter in the SIP Contact Header. If the requested algorithm cannot be supported, the mismatch is signaled with a 485 "Ambiguous" SIP response. The response may include the supported "avaya-asm-cra-name=" parameters in contact headers.

The CRA-name is one example proprietary identifier for all of the Contact Resolution Algorithms developed by a particular company or collection of companies. (e.g., CRA-name is an identifier of algorithms developed by Avaya, a registry of which will need to be maintained for these identifiers.) By way of example, the following table might indicate an appropriate the use of the CRA-name parameter.

| CRA Name | Implements ... |
| --- | --- |
| Sequential.1 | Sequential Forking |
| Sequential.2 | Sequential Forking (Improved) |
| Sequential10.1 | Sequential Forking at 10 second intervals |
| Parallel.1 | Parallel Forking |
| RRLoadBal.1 | Round Robin Load Balancing |
| SmartLoadBal.1 | Smart Load Balancing |
| ENR.1 | External Network Route (EC-500) |

RFC 3261 defines a "q-value" submitted by the endpoint (e.g., SIP network element 124 in this particular case) as part of contact registration that is intended to help set priorities between contacts during the contact resolution phase of SIP Invite Processing. The "q-value" has a range of "0.000 to 1.000", with 1.000 having the highest priority. SIP does not define the exact use of "q-value". It is particularly problematic that there are no constraints on who can set or re-set q-value. Contact Resolution Algorithms are free to inspect or ignore q-value to achieve their goals. It is recommended that the initial Smart Load Balancing Algorithm completely ignore q-value and base all of its routing decisions on current Score as provided by the Score Update Event Notification.

In accordance with at least some embodiments of the present invention, a score update event conveys two pieces of information, 1) the absolute score at the time of the update and 2), an adjustby parameter specific to the Contact Resolution Algorithm. The idea behind the adjustby parameter is that each time the call routing algorithm 120 selects a winning SIP network element 124, the score of that SIP network element 124 is adjusted (up or down) according to the most recently published adjustby value. This relaxes the need to publish frequently to track rapidly changing scores during high call traffic periods.

Figure 3:
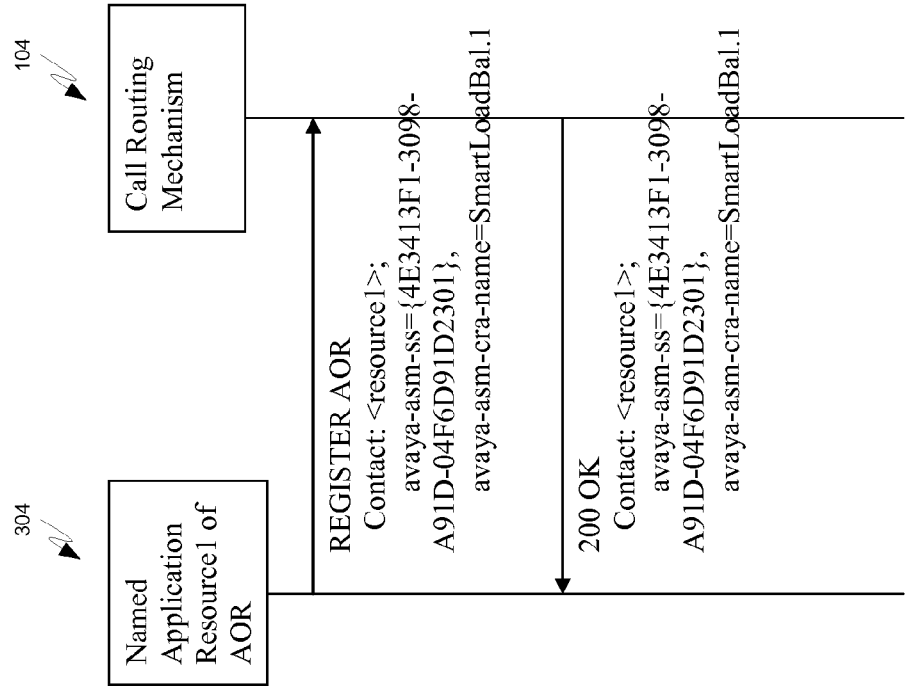
FIG. 3 is message signaling diagram depicting a registration method in accordance with embodiments of the present invention.

A successful initial registration of a SIP network element 124 should result in the score being set to the maximum negative value and adjustby values being set to zero for that SIP network element 124. A registration refresh should not alter either the score or the adjustby value. Score and adjustby value updates are to be provided only by publishing the Score Update event, which is set to occur either periodically or when the state of availability of the SIP network element 124 significantly changes. FIG. 3 illustrates one example of how a contact resource of an application 304 (i.e., a SIP network element 124) associates itself with a specific AOR through SIP registration.

Each new successful resource registration populates a new contact row in the contact resolution table 116 for the application 304 associated with the AOR or any of its aliases. In accordance with at least some embodiments of the present invention, named applications 304, like users, may have up to three AOR's which are treated as aliases of one another. The application may be addressed using the numeric AOR, the handle AOR or the E.164 AOR of the named application. There is only one set of contacts for a user regardless of which of the three AOR aliases is used. Table 1 illustrates the contact entry for an initial registered contact (i.e., SIP network element 124).

TABLE 1

Contact Table for the AOR of an initially registered contact
Contacts for AOR [+13035384000; 3035384000@avaya.com;
AppHandle@avaya.com] using ss=={4E3413F1-3098-A91D-
04F6D91D2301} and CRA-name= SmartLoadBal.1.

| Contact | q | Score | AdjustBy |
|---------|-----|-------------|----------|
| Resource1 | 1.0 | −2147483648 | 0 |

Publishing

The SIP PUBLISH method allows a publishing SIP network element 124 to "hand-off" an event package payload to the call routing mechanism 104.

Score Update, in accordance with at least some embodiments of the present invention, is a SIP event package utilized in connection with Smart Load Balanciing. Each time a published ScoreUpdate is received, the corresponding state information in the contact resolution table 116 is updated. If the AOR is a member of a community for which a geo-redundant group has been provided, the updated contact entries are also synchronized to the other members in the community's geo-pair. The synchronization function may be implemented by non-SIP means. As can be seen in FIG. 2, synchronization could occur between multiple instances (e.g., geo-redundant instances) of the call routing mechanism 104.

An exemplary ScoreUpdate message (i.e., a modified SIP PUBLISH message) is depicted below as if sent from the contact address of "5432@cm4.dr.avaya.com" (i.e., the address of the SIP network element 124) in which had previously registered under the AOR of "5432@avaya.com".

```
PUBLISH sip:5432@avaya.com SIP/2.0
From: sip:5432@avaya.com;tag=a78cf4544453749b8-
463a2280__F135.8.62.52
To: sip:5432@avaya.com
Call-ID: 2__748e93b5-7493c4f7-463a2290__S@cm4.dr.avaya.com
CSeq: 12 PUBLISH
Via: SIP/2.0/TCP 135.8.62.52:5060;branch=z9hG4bK1__748e93b5-
35fc5057-463a227a__S
Max-Forwards: 70
Contact: <sip:5432@cm4.dr.avaya.com;transport=tls>
Event: avaya-asm-score-update
User-Agent: Avaya CM/Rxxxx
Content-Type: application/avaya-asm-score-update+xml
Content-Length: 123
<?xml version="1.0" encoding="utf-8"?>
<ScoreUpdate xmlns ="http://xml.avaya.com/schemas/ASMScoreUpdate"
xmlns:xsi="http://www.w3.org/2001/XMLSchema-instance">
    <Score>29563</Score>
    <AdjustBy>−53</AdjustBy>
    <ss>{4E3413F1-3098-A91D-04F6D91D2301}</ss>
    <cra-name>SmartLoadBal.1</cra-name>
</ScoreUpdate>
```

There are several noteworthy observations. Notice there is no Expires Header. This is because the ScoreUpdate is a checkpoint value only valid at an instant of time. It is not a persistent state in accordance with at least some embodiments of the present invention.

Notice that Etags are not used because there is only one publisher per contact, and the publish always overwrites the previous value. Hence, there is no need for Etags, although the use of Etags may also be possible.

It should also be noted that although "ss" and "cra-name" are included in the example, they are optional elements in the XML payload when sent by a registered SIP network element 124. Since a contact or SIP network element 124 must appear in the contact resolution table 116 for the update to succeed and since these values are checked at registration time, there is no need to include them for registered SIP network elements 124. They are shown here for the manually provisioned case where human error could result in a mismatch in either of these fields. ScoreUpdates sent by provisioned SIP network elements 124 should include at least some of these fields. If a mismatch occurs, the Publish would receive a 403 Forbidden response.

It should also be noted that the ScoreUpdate event package is not application-specific in its basic form. This same event package could invoke a completely different contact resolution algorithm and provide two integer arguments to that algorithm.

Remember that the Smart Load Balancing executed by the call routing algorithm 120 will route each new call addressed to an AOR to the specific SIP network element 124 of that AOR that has the highest score at that instant. The algorithm 120 will then adjust this highest score by the adjustby amount in preparation for the next new call routing decision. Asynchronously published ScoreUpdate events received from individual SIP network elements 124 update the score and adjustby values in the contact resolution table 116 for the publishing SIP network element 124. The overall performance of Smart Load Balancing is an interaction between the call routing algorithm 120 running at a per-call rate but not tracking call state, and the ScoreUpdate events which arrive asynchronously and approximate the state and rate of change of resource availability for the SIP network elements 124.

Smart Load Balancing does not prescribe a specific way to calculate the score and adjustby values that characterize the SIP network element's 124 resource availability to the call routing algorithm 120. Some applications may use the number of available channels, call arrival rates and average call holding times to calculate a score. Other applications may use a ratio of the number of available agents to total agents for part of the score range, and then switch to a measure of time in queue when all agents are busy for another part of the score range. These score calculations along with the strategy for when to publish updates are left up to each application. In accordance with at least some embodiments of the present invention, when a new Update/Publish algorithm combination is created it should obtain a GUID and use it as the Score Signature to identify the algorithm.

Most applications will want to consider the following guidelines when creating an Update/Publish algorithm rule set:

Don't re-publish on the arrival of each new call. Instead rely on the adjustby value to walk the score value down with the delivery of each call. Publish only on every significant change of Score. (The definition of what is a significant change of score depends on the algorithm used to generate the score.)

Don't try to bundle ScoreUpdate's for multiple SIP network elements 124 in a single SIP PUBLISH message. Changes to resource 128 availability happen asynchronously and trying to bundle will generally increase latency. Latency impairs most ScoreUpdate strategies. Instead send updates for a single SIP network element 124 in a single SIP PUBLISH message.

Consider how the algorithm behaves when all SIP network elements 124 are equally available especially in low-traffic and low-resource conditions. When human call-center agents are involved, consider the fairness of the algorithm to agents being paid on a per-call basis.

To accommodate low-traffic conditions it is generally a good idea to implement a "lowest-frequency publish limit" so that even when there is low traffic, the scores associated with a particular SIP network element 124 are periodically updated to reflect resources 128 coming free at the end of calls. The Contact Resolution Algorithm is generally not call-stateful and does not attempt to track the lifetime of calls it has previously routed. The ScoreUpdate is the mechanism used to track increasing resource availability due to previously routed calls being completed.

Updating

Figure 4:
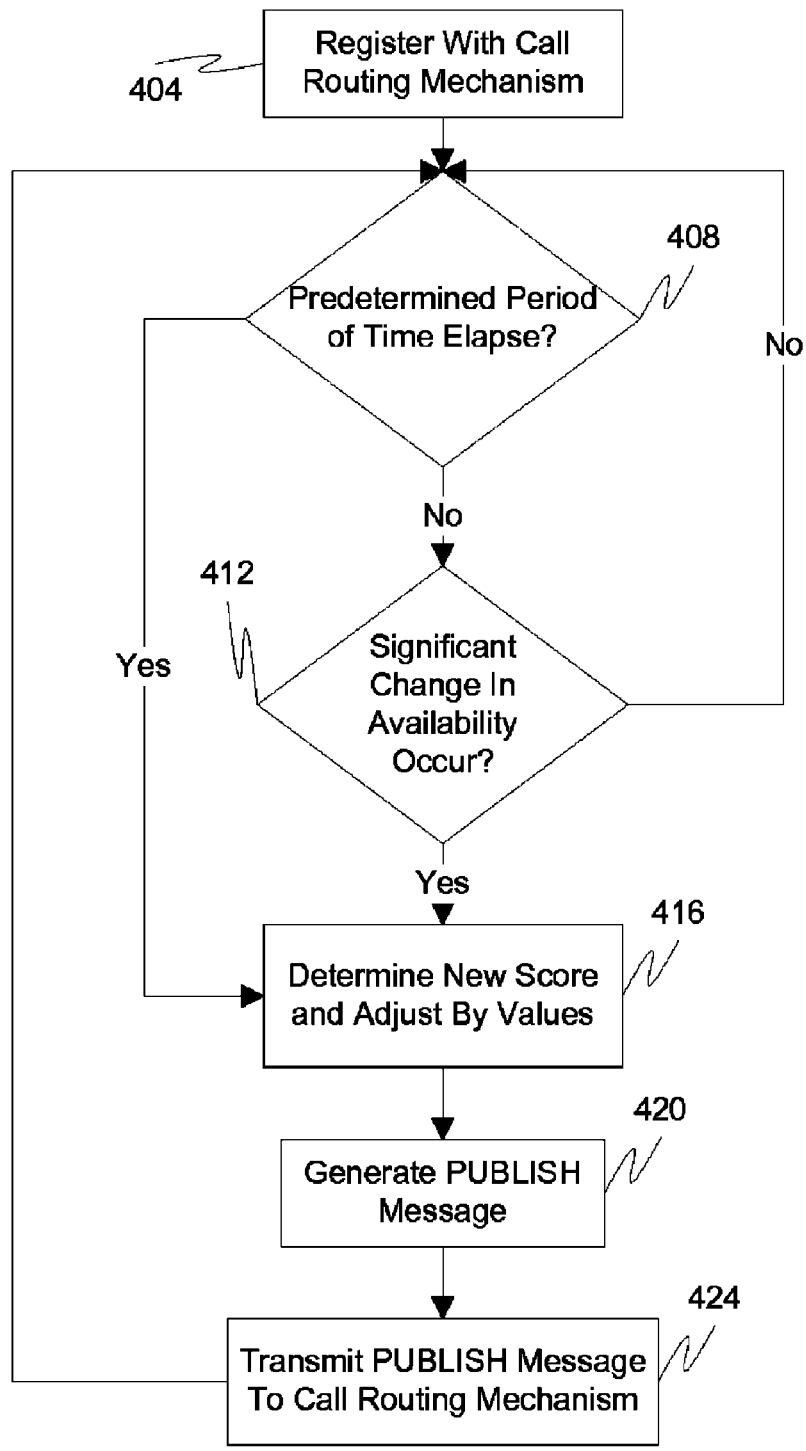
FIG. 4 is a flow diagram depicting a score update method in accordance with embodiments of the present invention.

Referring now to FIG. 4, an exemplary method of updating availability information at a call routing mechanism 104 will be described in accordance with at least some embodiments of the present invention. The method begins after a SIP network element 124 has registered with the call routing mechanism 104. Thereafter, the method continues with the SIP network element 124 determining whether a predetermined amount of time has passed (step 408) or whether a significant change in availability for the SIP network element 124 has occurred (step 412). If neither of these are answered affirmatively, then the SIP network element 124 will continue to wait until the occurrence of at least one of those events.

If, however, at least one of those events does occur, then the method continues with the SIP network element 124 determining new scores and adjustby values that are currently applicable to the SIP network element 124 (step 416). Factors that may be considered when determining an adjustby value include, but are not limited to, the number of resources 128 associated with the SIP network element 124, the type of resources 128 associated with the SIP network element 124, the nature of the SIP network element 124, and so on. As an example, if substantially identical SIP network elements 124 have a different number of resources 128 associated therewith, the SIP network element 124 having a greater number of resources 128 associated therewith may have a lower adjustby value than the similar SIP network element 124 having a lesser number of resources 128 associated therewith. This is because each assignment of a call to the SIP network element 124 having the greater number of resources 128 associated therewith will have a less significant impact on the pool of available resources 128 for the SIP network element 124 than the SIP network element 124 having a lesser number of resources 128 associated therewith.

Upon determining its new score and adjustby values, the SIP network element 124 generates a SIP PUBLISH message as described above such that the determined score and adjustby values are included in the SIP PUBLISH message (step 420). The SIP network element 124 then transmits the SIP PUBLISH message to the call routing mechanism 104 (step 424). The process continues at step 408 in preparation for each subsequent PUBLISH message.

When the SIP PUBLISH message is received by the call routing mechanism 104, the appropriate fields of the message are analyzed and the score and adjustby values are extracted from the message. These newly received score and adjustby values are used to update the contact resolution table 116 for the SIP network element 124 that transmitted the SIP PUBLISH message.

Routing

Figure 5:
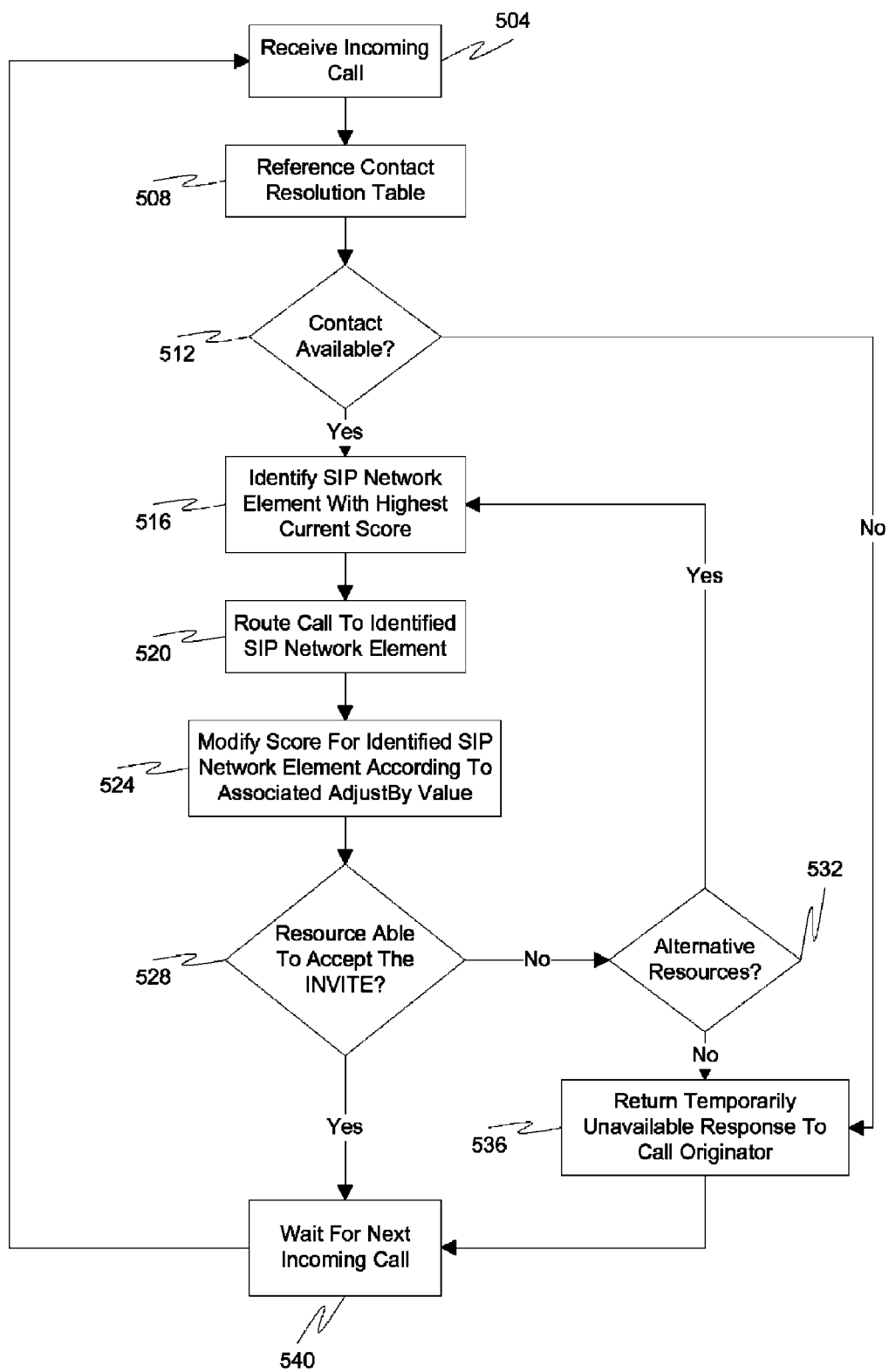
FIG. 5 is flow diagram depicting a call routing method in accordance with embodiments of the present invention.

Referring now to FIG. 5, an exemplary call routing method will be described in accordance with at least some embodiments of the present invention. The method begins when an incoming call is received at the call routing mechanism 104 (step 504). For each incoming call, the algorithm 120 finds the contact (i.e., SIP network element 124) with the highest score and routes the call there. Thus, as a first step, the call routing algorithm 120 references the contact resolution table 116 (step 508) to determine if a contact is available to have the call routed thereto (step 512). A contact with a Maximum Negative Score value should never win a load-balancing contest. If no contacts exist, or no contact can win a new call contest a 480 Temporarily Unavailable response will be returned (step 536).

If there is at least one available contact, the call routing algorithm 120 will continue by identifying the contact with the highest current score in the contact resolution table 116 (step 516). As can be appreciated, if two contacts have identical scores then the algorithm 120 may employ additional logic to select the winning contact from the set of contacts. Thereafter, the algorithm 120 continues by causing the call routing mechanism 104 to route the call to the winning contact (step 520). After a call has been sent to a contact, the call routing algorithm 120 then modifies the score for the assigned contact in the contact resolution table 116 by the adjustby value in preparation for the next call (step 524).

Even after winning a route contest, the possibility exists that a contact will not be able to accept the invite (e.g., a SIP INVITE message). If the invite is returned with a 486 busy here response (step 528), the call routing algorithm 120 should remove that contact from consideration and determine if alternative contacts exist (step 532). If there are additional available contacts in the contact resolution table 116, then the method returns to step 516 where the algorithm 120 holds a new contest with the remaining contacts. This process must end when all of the contacts have been tried. If all resources are busy, the call-routing mechanism 120 should return 480 Temporarily Unavailable (step 536). The algorithm 120 then proceeds to step 540 where it waits for the next incoming call.

In accordance with at least some embodiments of the present invention, the contact may choose to queue the call until a resource 128 becomes available, in which case the contact will return a 182 queued response. The response is provided by the contact and in no way effects the operation of the algorithm 120.

Additionally, a contact may cancel an invite if it determines that it is unfavorable to remain in the queued state. If the invite is sent again to the call routing mechanism 104, the algorithm 120 will again attempt to re-rote the call at step 516.

Once a call has been routed to a contact and the contact has returned a 200 OK response, the call is considered complete. Smart Load Balancing has no further influence over the call and the call routing mechanism 104 will wait for the next incoming call (step 540). Normal operation ensues with the dialog and routeset as established during the initial invite. Any new INVITE message to the AOR will, however, result in a new route contest being executed by the algorithm 120 (step 504).

As noted above, if no contacts win a routing contest because there are no contacts in the contact table, or because all of the contacts have a Score of Max Negative, the appropriate response is a 480 Temporarily Unavailable (step 536). If the algorithm 120 has knowledge that it is working in a Network Call Redirection environment, it may return a 380 Alternative Service response causing the network 112 to take back the call and route it elsewhere. It is also possible that the algorithm 120 determines that it is not possible to route the call to any alternative service, nor does it expect any upstream services to be able to provide service. In this case the correct response would be a 603 decline.

While the above-described flowcharts have been discussed in relation to a particular sequence of events, it should be appreciated that changes to this sequence can occur without materially effecting the operation of the invention. Additionally, the exact sequence of events need not occur as set forth in the exemplary embodiments. The exemplary techniques illustrated herein are not limited to the specifically illustrated embodiments but can also be utilized with the other exemplary embodiments and each described feature is individually and separately claimable.

The systems, methods and protocols of this invention can be implemented on a special purpose computer in addition to or in place of the described communication equipment, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, a communications device, such as a server, personal computer, any comparable means, or the like. In general, any device capable of implementing a state machine that is in turn capable of implementing the methodology illustrated herein can be used to implement the various communication methods, protocols and techniques according to this invention.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized. The analysis systems, methods and protocols illustrated herein can be readily implemented in hardware and/or software using any known or later developed systems or structures, devices and/or software by those of ordinary skill in the applicable art from the functional description provided herein and with a general basic knowledge of the communication and computer arts.

Moreover, the disclosed methods may be readily implemented in software that can be stored on a storage medium, executed on a programmed general-purpose computer with the cooperation of a controller and memory, a special purpose computer, a microprocessor, or the like. In these instances, the systems and methods of this invention can be implemented as program embedded on personal computer such as an applet, JAVA® or CGI script, as a resource residing on a server or computer workstation, as a routine embedded in a dedicated communication system or system component, or the like. The system can also be implemented by physically incorporating the system and/or method into a software and/or hardware system, such as the hardware and software systems of a communications device or system.

It is therefore apparent that there has been provided, in accordance with the present invention, systems, apparatuses and methods for balancing loads across a plurality of call SIP network elements. While this invention has been described in conjunction with a number of embodiments, it is evident that many alternatives, modifications and variations would be or are apparent to those of ordinary skill in the applicable arts. Accordingly, it is intended to embrace all such alternatives, modifications, equivalents and variations that are within the spirit and scope of this invention.

What is claimed is:

1. A method, comprising:
    receiving, at a load balancing engine of a call center, a Session Initiation Protocol (SIP) message from a first of a plurality of SIP network elements inside the call center, the first and a second of the plurality of SIP network elements are registered with the load balancing engine with a common Address of Record (AoR), and the SIP message provides availability information for the first SIP network element;
    updating a table entry in a contact resolution table of a call routing mechanism for the first SIP network element based on information contained in the SIP message, the contact resolution table is utilized to route incoming calls directed to the common AoR among the plurality of SIP network elements inside the call center;
    receiving, at the load balancing engine, a call from a first communication device directed to the common AoR;
    referencing the contact resolution table;
    identifying a destination target resource for the call based on information contained in the contact resolution table; and
    forwarding the call to a SIP network element associated with the destination target resource and also associated with the common AoR, the SIP network element associated with the destination target resource comprises an availability score that one of equals and exceeds an availability score of other SIP network elements in the plurality of SIP network elements which are also associated with the common AoR.

2. The method of claim 1, wherein the first SIP network element exposes access to a plurality of resources and wherein the first SIP network element is configured to transmit unsolicited SIP messages to the load balancing engine at least one of periodically and upon the occurrence of a significant change in the availability of the SIP network element.

3. The method of claim 1, wherein the SIP message comprises a SIP PUBLISH message.

4. The method of claim 1, wherein the SIP message comprises a score field and an adjustby field, wherein information in the score field represents an absolute availability score for the first SIP network element at the time of transmission of the SIP message, and wherein information in the adjustby field identifies a value by which the first SIP network element's score is to be adjusted when a call is forwarded to the first SIP network element.

5. The method of claim 1, wherein the plurality of SIP network elements register with the load balancing engine using at least one of manual and automatic registration mechanisms to populate the contact resolution table.

6. The method of claim 5, wherein successful initial registration of a SIP network element with the load balancing engine results in a score for the SIP network element being set to a maximum negative value and an adjustby value being initially set to zero for the SIP network element.

7. The method of claim 5, wherein during registration the SIP network element presents a score signature and a Contact Resolution Algorithm name (CRA-name) as part of its registration request, the method further comprising:
    reviewing, at the load balancing engine, the score signature and CRA-name;
    determining whether the score signature and CRA-name are valid; and
    in the event that at least one of the score signature and CRA-name are invalid, failing to register the SIP network element.

8. A non-transitory computer readable medium encoded with processor executable instructions operable, when executed, to perform the method of claim 1.

9. A load balancing device of a call center to receive a Session Initiation Protocol (SIP) message from a first of a plurality of SIP network elements inside the call center, which share a common Address of Record (AoR), the SIP message provides availability information for the first SIP network element, the load balancing device comprising:
- a contact resolution table, the load balancing device to update a table entry in the contact resolution table of a call routing mechanism for the first SIP network element based on information contained in the SIP message, the load balancing device is to utilize the contact resolution table to route incoming calls directed to the common AoR among the plurality of SIP network elements inside the call center;
- the load balancing device to receive a call from a first communication device directed to the common AoR, reference the contact resolution table, identify a destination SIP network element for the call based on information contained in the contact resolution table, and forward the call to the destination SIP network element; the destination SIP network element comprises an availability score that one of equals and exceeds an availability score of other potential SIP network elements in the plurality of SIP network elements.

10. The device of claim 9, wherein the first SIP network element is configured to transmit unsolicited SIP messages at least one of periodically and upon the occurrence of a significant change in the availability of the first SIP network element.

11. The device of claim 9, wherein the SIP message comprises a SIP PUBLISH message.

12. The device of claim 9, wherein the SIP message comprises a score field and an adjustby field, wherein information in the score field represents an absolute availability score for the first SIP network element at the time of transmission of the SIP message, and wherein information in the adjustby field identifies a value by which the first SIP network element's score is to be adjusted when a call is forwarded to the first SIP network element.

13. The device of claim 9, wherein the plurality of potential SIP network elements register with the load balancing device using at least one of manual and automatic registration mechanisms to populate the contact resolution table.

14. The device of claim 13, wherein successful initial registration of a potential SIP network element results in a score for the potential SIP network element being set to a maximum negative value and an adjustby value being initially set to zero for the potential SIP network element.

15. The device of claim 13, wherein during registration the potential SIP network element presents a score signature and a Contact Resolution Algorithm name (CRA-name) as part of its registration request.

16. The device of claim 15, wherein the device is further operable to review the score signature and CRA-name, determine whether the score signature and CRA-name are valid, and in the event that at least one of the score signature and CRA-name are invalid, fail to register the potential SIP network element.

* * * * *